United States Patent [19]
Roetgerink

[11] 3,982,637

[45] Sept. 28, 1976

[54] DEVICE FOR DIRECTED DISCHARGE OF CONICAL ARTICLES

[75] Inventor: Johannes Antonius Roetgerink, Hengelo, Netherlands

[73] Assignee: Machinefabriek M. Brouwer & Co. B.V., Hengelo, Netherlands

[22] Filed: Nov. 8, 1974

[21] Appl. No.: 522,090

[30] Foreign Application Priority Data

Nov. 15, 1973 Netherlands.................. 7315703

[52] U.S. Cl............................. 214/6 D; 214/8.5 G; 214/1 Q; 198/407
[51] Int. Cl.².................................... B65G 57/08
[58] Field of Search.............. 214/8.5 R, 8.5 K, 6 F, 214/6.5, 6 D, 8.5 G; 198/29, 34, 266, 268, 269, 272, 273, 277

[56] References Cited
UNITED STATES PATENTS

| | | | |
|---|---|---|---|
| 3,389,777 | 6/1968 | Rysti | 198/269 X |
| 3,517,797 | 6/1970 | Daleffe et al. | 198/273 X |

FOREIGN PATENTS OR APPLICATIONS

| | | | |
|---|---|---|---|
| 724,783 | 2/1955 | United Kingdom | 198/277 |
| 1,091,207 | 11/1967 | United Kingdom | 198/273 |

*Primary Examiner*—Frank E. Werner
*Attorney, Agent, or Firm*—Eyre, Mann, Lucas & Just

[57] ABSTRACT

A device for directed discharge of conical articles, like yarn bobbins, having with a number of pairs of juxtaposed supporting units cf which the distance corresponds with the length of the articles each unit comprising at least two supporting members, movable with respect to each other.

21 Claims, 3 Drawing Figures

DEVICE FOR DIRECTED DISCHARGE OF CONICAL ARTICLES

BACKGROUND OF THE INVENTION

My invention relates to a device for directed discharge of conical articles, like yarn bobbins, comprising a feeding mechanism for feeding the articles, in a direction perpendicular to the longitudinal direction of the juxtaposed articles, to a directing mechanism.

DESCRIPTION OF THE PRIOR ART

Such a device is known from the French Pat. No. 1.491.121. The device disclosed in the aforementioned specification comprises a springloaded member which reciprocates in a direction parallel to the axis of the articles and at a small distance over the articles. By this means the articles are moved in two directions as a function of the direction of the conical shape thereof.

Due to the reciprocation of the resilient member and the parts connected therewith, troublesome vibrations are set up in the device described above, which, together with the mass forces produced, limit the operating speed of the device. This device has more disadvantages due to the fact that only lots of articles with identical dimensions can be handled and that the construction and drive are rather complicated.

SUMMARY OF THE INVENTION

My invention seeks to obviate these drawbacks and comprises a device having a plurality of pairs of supporting units, arranged in juxtaposition and situated at a distance corresponding to the length of the articles from each other, each unit consisting of at least two supporting members, at least one of which is movable relative to the other supporting member in order to change their mutual spacing, and an operating member for progressively increasing the mutual spacing from a first to a second value, and returning it to its first value.

These measures provide a simple contact device in which the mass of the reciprocating parts is very small, which ensures, besides dependable service, a noiseless, vibrationless, running of the device.

Figure 1:
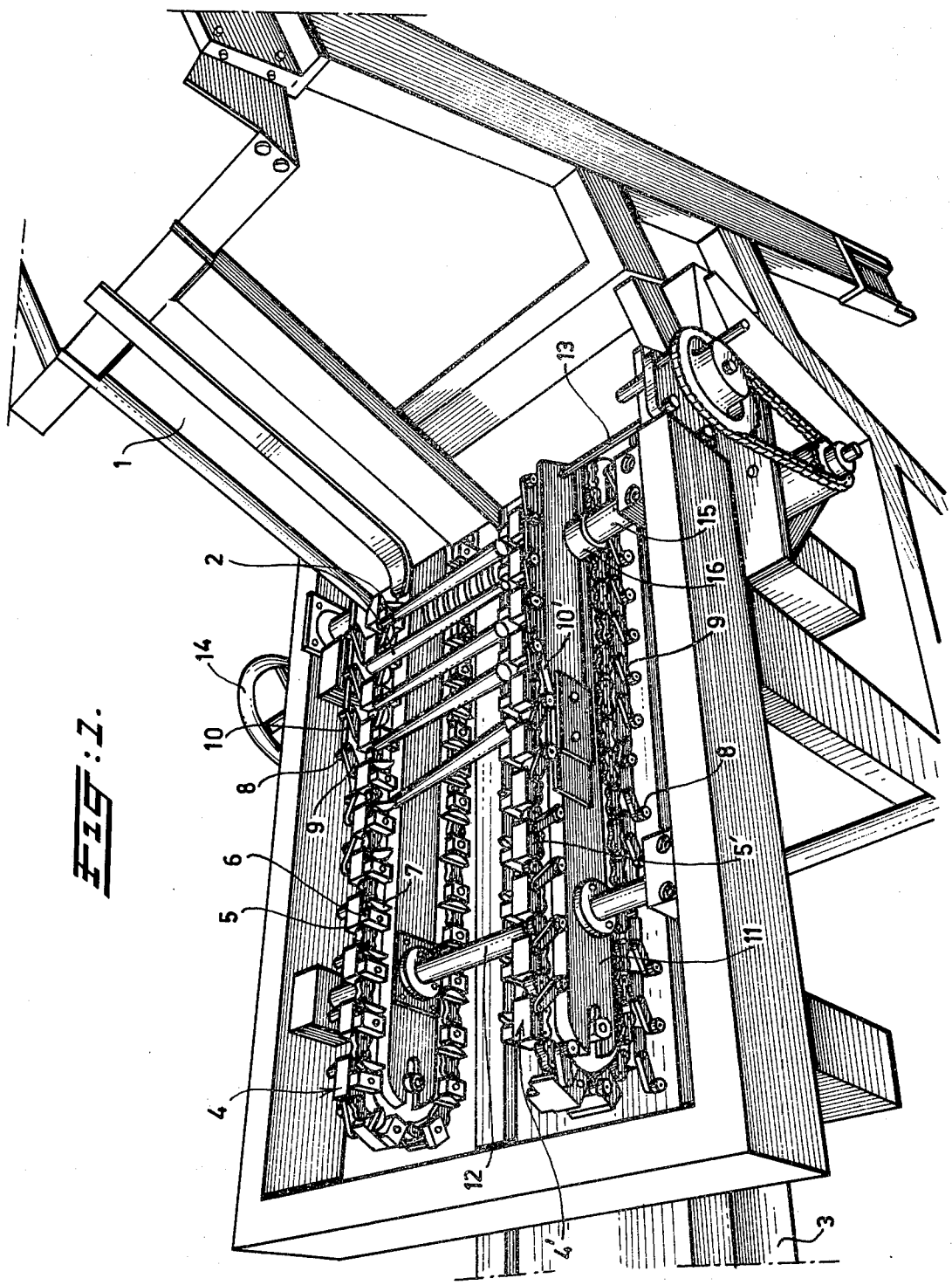
FIG. 1 shows a perspective view, substantially as seen from above, of the device.

DESCRIPTION OF PREFERRED EMBODIMENTS:

The device depicted in FIG. 1 shows a feeding mechanism 1 for conical articles 2 like yarn bobbins, a discharge mechanism consisting of a belt conveyor 3 and a directing mechanism. The directing mechanism consists of a plurality of pairs of supporting units 4, 4' which are received in a pair of parallel endless chains 5, 5'.

A first supporting unit of each pair of supporting units 4, 4' is secured to a first chain 5 and a second supporting unit 4' is secured to a second chain 5'.

Figure 2:
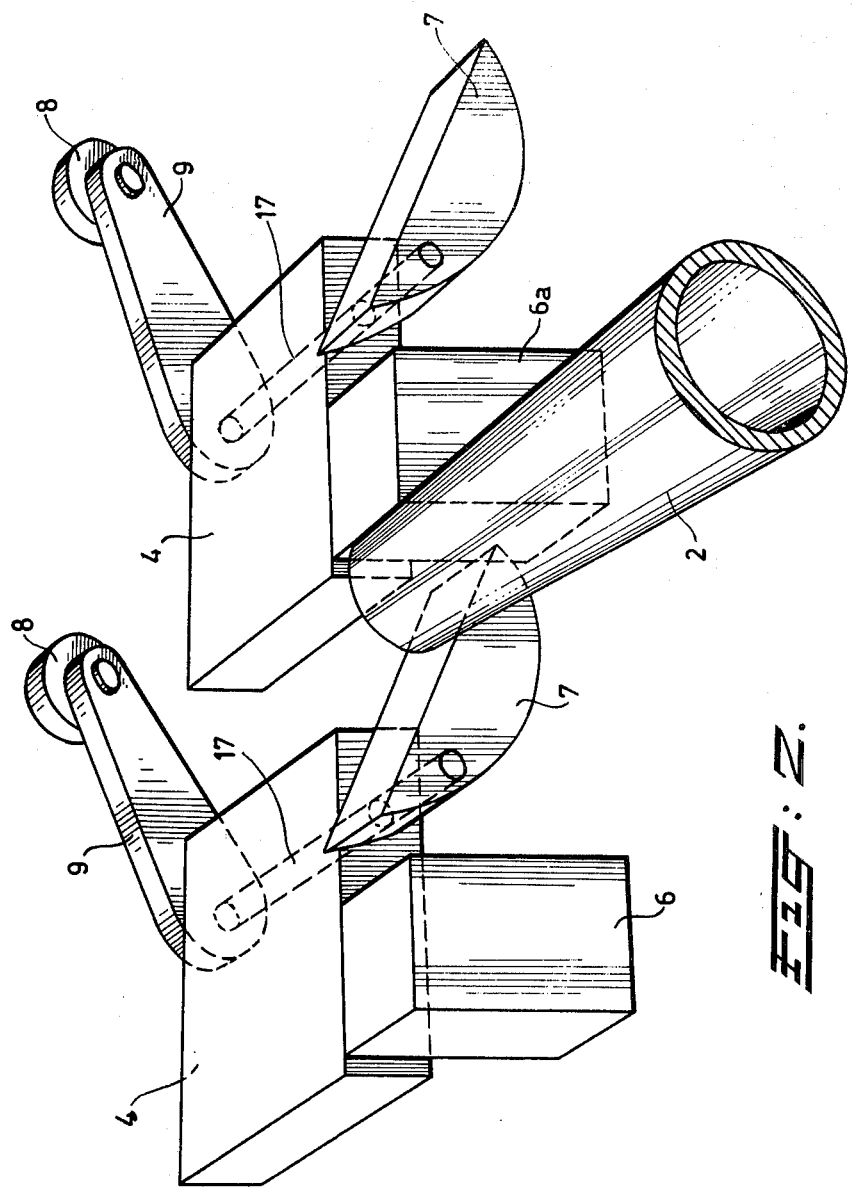
FIG. 2 is a perspective view showing on a larger scale two supporting members which support a yarn bobbin at one end.

The two chains 5, 5' can be driven via a common driving shaft 13 at the same speed. Each pair of supporting units 4, 4' can support the two ends of a yarn bobbin 2. Each individual supporting unit 4, 4' is provided with a fixed supporting member 6 and a supporting member which can turn on a pin 17 (FIG. 2).

The centerline of the pin 17 extends about parallel to the centerline of the yarn bobbins. The rotatable supporting member 7 is secured to the one end of the pin 17, while an arm 9, provided with a guide roller 8 is secured to the other end of the pin 17.

The device is further provided with a pair of curved ways 10, 10' which can cooperate with the guide rollers 8. Each curved way 10, 10' constitutes consequently an operating member for controlling the position of the rotatable supporting members 7 and as a consequence, for controlling the mutual spacing between the fixed and the rotatable supporting members 6, 7, respectively.

In the embodiment shown in FIG. 1 the guide rollers travel along the curved ways 10, 10' due to the force of gravity. When the velocity of the chains 5, 5' is such that the guide rollers 8 could intermittently clear the curved ways 10, 10', this undesired result can be avoided by using compression springs. The force exerted by the compression springs serves to supplement the force of gravity and causes also an increase of the force at right angles between each guide roller 8 and the associated curved way 10. So, for instance, a spiral spring can be used in the supporting unit 4, by which a righthanded torque is applied to the pin 17. It is further possible to construct the curved ways 10, 10' two-sided so that a compulsory motion is imposed on the rotatable supporting members 7.

The curved ways 10, 10' are symmetric to the effect that they are mirror-symmetrical, so that every two rotatable supporting members 7 belonging to one pair always correspond to each other relative to position.

For supporting one end of the yarn bobbin 2 a rotatable supporting member 7 cooperates with the fixed supporting members 6 of the near supporting unit 4. By increasing the spacing between these supporting members 6, 7 the yarn bobbin 2 can be released at the respective end. The diameter of a bobbin differs at its two ends and corresponding the spacing between the fixed and rotatable supporting members 6, 7 at the two ends corresponding to each other consequently, the bobbin 2 will always first be released at the narrower end. A bobbin released in this way falls on the belt conveyor 3 and is thereby discharged while the narrower end is directed in the direction of conveyance.

According to a second non-represented embodiment more curved tracks each with a particular lifting height may consecutively adjoin each other. As a consequence, the mutual spacings between the fixed and the rotatable suppporting members 6, 7 respectively, may be increased in several steps from a minimum to a maximum value. In this way it is possible to deal with bobbins of different thickness and/or difficult conical shape. These different bobbins may thereby be assorted by equipping the discharge device with several belt conveyors such that for each stage of the curved ways 10, 10' a belt conveyor is arranged. From a constructive point of view, the belt conveyors can be arranged in such a way that their direction of movement is perpendicular to that of the chains 5, 5'.

The spacing between the two chains 5, 5' is adjustable in the embodiment represented in FIG. 1, whereby the device can be adapted to bobbins of different length. The chain 7' is for that purpose mounted on a carriage 11 which can slide on a fixed shaft 12 and a driving shaft 13. The shift can be effected by means of a hand wheel 14 secured to the end of a threaded spindle 15 which cooperates with a nut 16 secured to the carriage 11.

Figure 3:
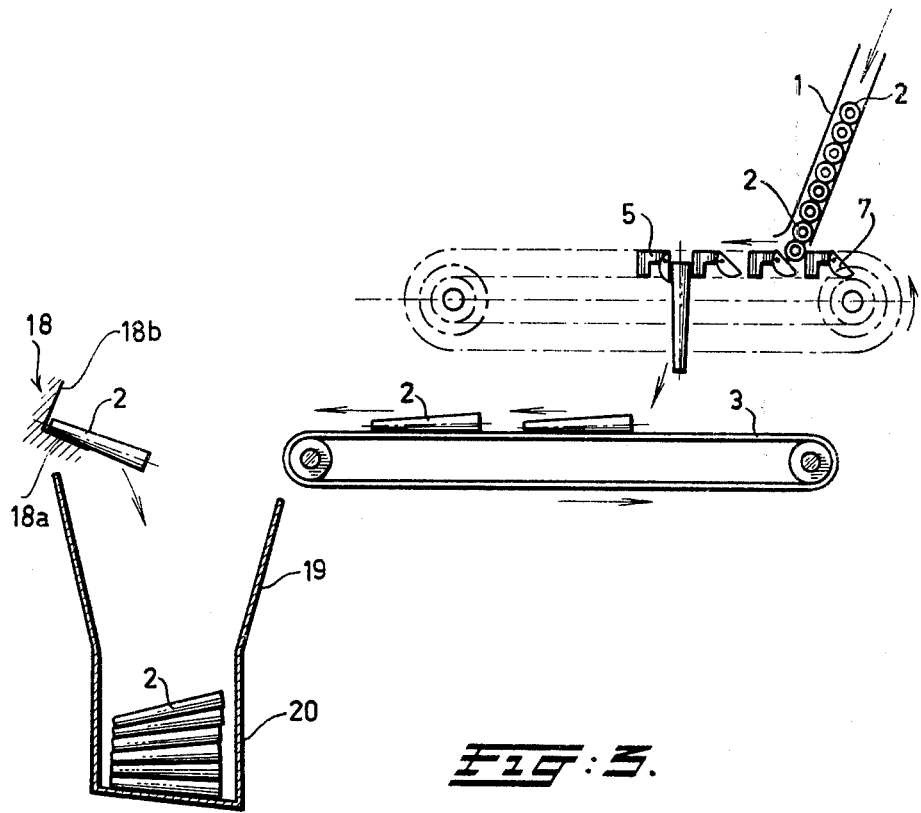
FIG. 3 shows diagrammatically the complete device with accessories.

The entire device for directed discharge of conical articles is diagrammatically represented in FIG. 3. The direction of conveyance of the articles is indicated by arrows. The operative of the device is as follows:

The conical articles which, in this case consist of thin-walled hollow yarn bobbins, are supplied in a transverse direction and introduced into the magazine 1. The magazine is constructed in such a way that a plurality of bobbins 2 are transversely stacked in a single layer. The conveyance and stacking of the bobbins 2 in a transverse direction is advantageous in that thereby the so-called "stick-formation" is avoided. "Stick formation" is disadvantageous and occurs when the yarn bobbins, 2 slide axially into each other, whereby the bobbins as it were, constitute sticks of greater or shorter length.

The bobbin stock in the magazine 1 is kept up in a way known per se by means of detectors, like photoelectric cells which can switch on and switch off, respectively, the feeder for the bobbins.

The magazine 1 opens over the directing mechanism so that the lowermost bobbin from the magazine 1 bears on a pair of supporting members 6, 7 situated thereunder.

Due to the movement of the chains 5, 5' of which the supporting members 6, 7 form a part, the lowermost bobbin is removed from the magazine and taken along. The next bobbin falls from the magazine and lands on a next pair of supporting members, whereupon the process is repeated.

The bobbin 2 which is carried along is subsequently released at its narrower end and falls by this end on the belt conveyor 3. The velocity of the belt conveyor 3 is considerably greater than that of the chains 5, 5' so that an impulse is imparted to the narrower end of the bobbin as soon as the bobbin contacts the belt conveyor 3. This impulse directs the bobbin 2 in the direction of conveyance of the belt conveyor 3, so that the bobbin is discharged at a rather high speed in a longitudinal direction, while the narrow end is directed towards the front. The bobbin 2 subsequently leaves the belt conveyor 3 at a fast rate in a horizontal direction and is subsequently braked by a stop 18. This stop 18 is constructed in such a way that at that location no stick formation can arise. For that purpose the stop 18 has two surfaces, viz. a slightly inclined tilting surface 18a and a braking surface 18b which is approximately perpendicular thereto. The tilting surface 18a is arranged in the path of the bobbin, so that the latter strikes this surface at first. As a consequence of the impact against the inclined surface 18a the bobbin slightly tilts from its horizontal position. Due to this tilting, the wide end of the bobbin sinks, so that a next bobbin cannot possibly come into contact with this wide end. As a consequence, stick formation is efficiently avoided and there is a possibility of a greater production.

Subsequently to the bobbin 2 striking by its narrow end the braking surface 18b, it is thereupon repulsed in an oblique downward direction and falls then via a chute 19 into a receptacle 20 or the like.

What I claim is:

1. Apparatus for directed discharge of conical articles comprising feeding means for feeding the articles in a direction perpendicular to the longitudinal direction of said articles to directing means, said directing means comprising a plurality of opposed pairs of supporting units arranged in juxtaposition and separated from each other by a distance corresponding to the length of said articles, each said unit comprising at least two supporting members, one of which is operatively movable with respect to the other to change their mutual spacing, and guide means for progressively increasing the mutual spacing from a first to a second value, and back to its first value whereby, first one end of the article is released thus orienting the article about the supported other end of the article and then releasing the said other end of the article.

2. Apparatus according to claim 1, wherein said directing means further comprises a pair of parallel endless chains, and the supporting units are received therein, each pair of supporting units comprising a first supporting unit which is secured to a first chain and a second supporting unit which is secured to a second chain.

3. Apparatus according to claim 2, wherein the spacing between said pair of chains is adjustable.

4. Apparatus according to claim 1, wherein said directing means further comprises a plurality of pins and wherein each supporting unit is provided with a fixed supporting member and a movable supporting member which is rotatable about a respective pin, the axis of each pin being substantially parallel to that of the conical articles, each rotatable supporting member being secured to one end of a respective pin, a plurality of arms being provided with a guide roller secured thereto, each said arm being secured to the other end of a respective pin, said guide means for controlling the spacing between respective fixed and rotatable supporting members comprising at least one pair of opposed parallel tracks operative to engage respective guide rollers.

5. Apparatus according to claim 4, wherein said tracks are vertically curved, said curve being vertically varied whereby the engagement of the rollers and track is operative to progressively increase the mutual spacings between the fixed and rotatable supporting members from a minimum to a maximum value.

6. Apparatus according to claim 4, further comprising step means associated with each of said tracks operative to vary the mutual spacings in at least one step from a minimum to a maximum value.

7. Apparatus according to claim 6, wherein said step means comprise at least one plate secured to each track operative to vary the vertical height of each track in at least one step.

8. Apparatus according to claim 1 further comprising at least one belt conveyor for discharging the conical articles, the direction of movement of the at least one belt conveyor being parallel to that of the chains.

9. Apparatus according to claim 8, further comprising a stop being arranged behind each belt conveyor, which comprises a slightly inclined tilting surface and a braking surface perpendicular thereto.

10. Apparatus according to claim 1, wherein said feeding means comprises a magazine in which a plurality of conical articles are transversely stacked in a single layer.

11. Apparatus for discharging conically-shaped articles with the longitudinal axes of the articles oriented in the direction of discharge comprising:

a. feeding means for feeding the articles to supporting means with the longitudinal axes of the articles approximately normal to the direction of feed;

b. supporting means for receiving the articles from said feeding means and supporting said articles at opposed ends thereof with the longitudinal axes thereof approximately normal to said direction of feed;

c. means for moving said supporting means at a first speed in a direction approximately normal to said direction of feed;

d. releasing means for sequentially releasing first one end of each said articles and then the other; and e. receiving means having a surface moving in the direction of discharge at a second speed greater than said first speed, said surface being positioned below said releasing means to receive the first released end and then the second released end of the articles whereby they are rotated in the direction of discharge approximately 90° due to the movement of said surface with the longitudinal axes of the articles oriented in the direction of discharge.

12. Apparatus according to claim 11 further comprising discharge means for discharging and stacking the rotated articles.

13. Apparatus according to claim 12, wherein each of said supports comprises at least two supporting members relatively positioned to engage a respective end of a respective articles.

14. Apparatus according to claim 13, wherein said releasing means comprise separating means for varying the relative distance between a first of said at least two supporting members and an adjacent member.

15. Apparatus according to claim 14, wherein said separating means comprises pivot means for sequentially pivoting each said first member.

16. Apparatus according to claim 15, wherein said pivot means comprise a plurality of pins, each pin being secured at a first end thereof to a corresponding first member and being rotatably mounted on said supporting means.

17. Apparatus according to claim 16, wherein said pivot means further comprises a plurality of guide members, each guide member being secured to a corresponding pin at an end thereof opposed to said first end.

18. Apparatus according to claim 17, wherein said pivot means further comprises guide means operative to engage and sequentially pivot each said guide member as said supporting means is moved whereby the relative distance between a respective first member and an adjacent member is varied.

19. Apparatus according to claim 12, wherein said discharge means comprises a stop positioned upstream of said at least one conveyor comprising a slightly inclined tilting surface and a braking surface approximately perpendicular thereto.

20. Apparatus according to claim 11, wherein said supporting means comprise a plurality of opposed pairs of juxtaposed supports, each said pair being separated by a distance approximately corresponding to the length of the articles.

21. Apparatus according to claim 11, wherein said receiving means comprises at least one conveyor.

* * * * *